United States Patent Office 2,893,982
Patented July 7, 1959

2,893,982

PROCESS FOR DECOLORIZING HYDROGENATED BUTADIENE POLYMERS WITH A SATURATED CARBOXYLIC ACID

Paul E. Campbell, Bartlesville, Okla., assignor to Phillips Petroleum Company, a corporation of Delaware No Drawing. Application December 27, 1954
Serial No. 477,827

14 Claims. (Cl. 260—85.1)

This invention relates to a process for decolorizing hydrogenated polybutadiene and hydrogenated butadiene styrene copolymers. In a more specific aspect this invention relates to a process of decolorizing these hydrogenated polymers by treating them with saturated carboxylic and mineral acids.

In Jones et al. application Serial No. 395,291, filed November 30, 1953, a process of preparing hydrogenated polymers is set forth. The hydrogenated products are especially valuable because of their low temperature characteristics, being flexible at temperatures as low as —100° F. and not brittle at temperatures approaching —200° F. Furthermore, they are more resistant to ozone degradation than are the unhydrogenated materials and have other improved physical properties. They are thermoplastic and can be vulcanized, the products being used to make fibers, films, dishes, coating materials, protective coverings, etc. For the hydrogenation, the polymers, substantially free of salts or other materials which act as hydrogenation catalyst poisons, are charged to a hydrogenation reactor in the form of a solution or dispersion in a suitable solvent.

Suitable solvents include saturated cyclic hydrocarbons such as cyclohexane, methylcyclohexane, decalin, and the like. Aromatic hydrocarbons, such as benzene and toluene, cyclic ethers, such as dioxane; and paraffinic hydrocarbons, such as isooctanes, isoheptane and normal heptane can also be used. Mixtures of solvents can be used if desired.

After the polymer has been dissolved in a solvent, a nickel catalyst is added, hydrogen is introduced and the temperature is raised to a suitable hydrogenation temperature, the hydrogenation being carried out in a batchwise or a continuous process. An efficient way of removing the hydrogenation catalyst is by passing the solution through a magnetic separator to remove the magnetizable catalyst. Processes employing other filters or centrifuges have also been used.

The polymers used as starting materials are selected from homopolymers of butadiene and copolymers of butadiene and styrene, prepared from monomer mixtures comprising not over 30 parts by weight of styrene per 100 parts by weight of monomers. The polymers are prepared by emulsion polymerization at temperatures between —5° F. and 140° F., preferably 20 to 60° F. In this emulsion polymerization, it has been found that approximately 75 to 85 percent of the butadiene polymer is formed as a result of 1-4 addition while 15 to 25 percent of the polymer is formed as a result of 1-2 addition. The Mooney viscosity of the polymer is preferably below 40 (ML-4) at 212° F.

Best results are obtained using a finely divided nickel-kieselguhr catalyst having a particle size of from 1 to 8 microns which has been activated at a temperature between 500 and 800° F. for a period of several hours by passing hydrogen thereover. Activation of such a catalyst at 600° F. for four hours using approximately 100 volumes of hydrogen per volume of catalyst, has been found to be particularly suitable. A greater amount of hydrogen, up to 1000 volumes of hydrogen per volume of catalyst, is sometimes used. Treatment with hydrogen reduces at least a part of the nickel to elemental nickel, generally 35 to 40 percent of the nickel being reduced. The reduced nickel content is preferably in the broad range of from 10 to 50 percent reduced nickel but some catalysts have a reduced nickel content of as high as 75 percent. Since the catalyst is charged on an unreduced basis, the weight of reduced catalyst is calculated and multiplied by the reduced nickel content to obtain the weight of the reduced nickel set forth above. For hydrogenation of the polymer, 2 to 30 weight percent on the unreduced basis of catalyst based upon the weight of polymers gives the preferred rate of hydrogenation.

Reaction pressures for the hydrogenation range from atmospheric to 3000 p.s.i.g., the usual range being in 100 to 1000 p.s.i.g. The temperature can range from 75° F. up to the degradation temperature of the polymer, maximum temperatures ranging as high as 700 to 1000° F. The preferred range is between 300 and 600° F. Reaction times in the range of 1 to 25 hours, preferably 2 to 8 hours can be employed.

To obtain a significant improvement in the properties of the polymer, the unsaturation should be reduced to a value of at least 50 percent of the original unsaturation and completely hydrogenated products can be obtained. However, when the polymer is completely hydrogenated it is no longer vulcanizable. Unsaturation in the range of 10 to 30 percent gives products with the best balance of physical properties.

This process and examples of materials produced thereby are more fully set forth in the above-identified Jones et al. application.

One difficulty which has been observed in the production of these hydrogenated polymers is that the products are sometimes gray or black in color. In molded samples, the gray or black color sometimes appears as opaque streaks or spots.

I have found a method by which these off-color products can be treated in order to remove the dark color and to provide materials which are clear or which have no more than a trace of yellow therein. The process of my invention comprises treating the polymer with an organic mono- or polycarboxylic acid containing 2 to 8 carbon atoms or with a mineral acid. The products can be treated as a solution or as a sheet or film of the material. An increase in light transmission, as much as 36 percent, has been obtained by this method, light transmission determinations having been made on molded discs of polymer using a Lumetron Colorimeter sold by the Schaar Company of Chicago.

Therefore, the following are objects of this invention:
An object of this invention is to provide a method for decolorizing hydrogenated polymers of butadiene. A further object of this invention is to provide a method for decolorizing hydrogenated polybutadiene or hydrogenated butadiene-styrene copolymers by treatment with saturated mono- or polycarboxylic acids containing 2 to 8 carbon atoms or mineral acids.

Other objects and advantages of this invention will be evident to one skilled in the art upon reading this disclosure.

As stated, the polymer is decolorized by treatment with a suitable acid. The acids include the carboxylic acids containing 2 to 8 carbon atoms such as acetic, propionic, butyric, valeric, caproic, heptanoic, and caprylic acids; dicarboxylic acids such as oxalic, malonic, succinic, glutaric, adipic, pimelic, azelaic, and sebacic acids. Mineral acids such as hydrochloric, phosphoric, and the like are also suitable although they must be used in concentrations below that at which reaction with the polymer occurs. Attempts to use formic acid have not been satisfactory in color removal.

The polymer can be treated with the acid while it is dispersed or dissolved in a solvent or the polymer can be treated while it is in a solid form of considerable size.

The acid is used in an amount from 0.01 to 5 percent of the weight of the polymer in most cases. Of course, larger amounts can be used, the upper limit being dictated by economy. Less time is usually required for decolorization when larger amounts of the acid are used.

While the polymer can be decolorized at room temperature and at temperatures as low as 35° F., the action is relatively slow and it is preferred to operate at temperatures within the range of 150 to 185° F. Temperatures up to the boiling point of the liquids present are sometimes used but are seldom necessary.

When the polymer is decolorized in the form of a solution, the solutions are usually quite dilute in order to eliminate the necessity of working with viscous solutions. I have found it desirable to operate with approximately 3 to 10 weight percent solutions. The same solvents used for the hydrogenation can be used for the decolorization and, in fact, one convenient method of carrying out the invention is to decolorize the solution from the hydrogenation operation directly after removing the catalyst.

The organic acids which are used to effect the decolorization of the hydrogenated polymer can be used in a substantially pure form or can be diluted with water and/or an organic solvent. In some cases the presence of a small amount of water increases the decolorizing activity of the acid.

The mechanism by which the decolorization takes place is not known. There is no visible indication of a reaction taking place. It is surprising therefore that such a small amount of acid is effective. Analysis of the polymer before and after decolorization shows the same nickel content and, thus, the reaction is not one of removal of the metal. Likewise, the result is not a function of the hydrogen ion concentration, because the addition of a base does not cause the color to reappear.

The treatment does not change the physical properties of the polymer. Measurements of tensile strength, elongation, softening point, and flex temperature show little, if any, change. Inherent viscosities are also substantially unchanged.

The following are specific examples of the process of my invention which illustrate preferred methods of operation. They should be considered as illustrative only.

EXAMPLE I

The light transmission of a discolored molded disc of hydrogenated polybutadiene of 8.9 percent unsaturation, prepared by hydrogenating a methylcyclohexane solution of a 25 (ML–4) Mooney polybutadiene with a nickel-kieselguhr catalyst, was measured. This disc was employed as a control in this example. Several solutions of the same hydrogenated polybutadiene in methylcyclohexane were then prepared using 25 grams of the hydrogenated polymer per 600 cc. of methylcyclohexane. To each of these solutions were added, with stirring, 100 cc. of acetic acid in the concentrations shown in Table 1. After the desired length of time, isopropyl alcohol was added to precipitate the hydrogenated polybutadiene. The precipitate was then washed several times with alcohol and vacuum dried at 50° F. Discs molded from the treated hydrogenated polybutadiene were then measured for light transmission using the Lumetron Colorimeter to determine the difference in light transmission between the treated and the untreated material. Results are tabulated below:

Table 1
LIGHT TRANSMISSION OF HYDROGENATED POLYBUTADIENE TREATED WITH ACID

| cc. Acetic Acid per 25 Grams Hydrogenated Polybutadiene | Concentration of Aqueous Acetic Acid, Volume percent | Treating Time, Hours | Increase in Light Transmission, Percent | Color of Disc | |
|---|---|---|---|---|---|
| | | | | Untreated | Treated |
| 100 | 100(glacial) | 1 | 33–36 | Gray | Colorless. |
| 100 | 75 | 1 | 33–36 | ..do.... | Do. |
| 100 | 50 | 2–3 | 33–36 | ..do.... | Do. |
| 100 | 25 | 24–27 | 33–36 | ..do.... | Do. |
| 100 | 10 | 30–33 | 33–36 | ..do.... | Do. |

Except for the difference in color, the discs appeared to be similar to those prepared from untreated material.

EXAMPLE II

Solutions in methylcyclohexane of a hydrogenated polybutadiene of 31.8 percent unsaturation prepared from a 41° F. 20 Mooney polybutadiene with a nickel-kieselguhr catalyst were decolorized by treatment with an excess of glacial acetic acid as in Example I. The solid product, obtained by drum drying of the solution, was molded into suitable forms for measuring various physical properties. The properties were compared with those of an untreated sample. Results are given in Table 2.

Table 2
PHYSICAL PROPERTIES OF HYDROGENATED POLYBUTADIENE

| Description of sample | Softening Point, °F.[1] | Tensile Strength, p. s. i. | Elongation, Percent | Flex Temperature, °F.[2] |
|---|---|---|---|---|
| Untreated | 135.0 | 180 | 610 | −98.0 |
| Treated with Acetic Acid | 135.0 | 200 | 610 | −98.0 |

[1] The softening point was determined by measurements on a simplified Goodrich Plastometer (Ind. Eng. Chem., Anal. Ed. 2, 96 (1931)). The plasticity was plotted against temperature and the softening point determined by extrapolation.
[2] The temperature where the apparent modulus of elasticity=135,000 p.s.i. as measured on a Tinius Olsen Stiffness tester according to ASTM: D1043-49T.

Treatment of a sample of hydrogenated polybutadiene with acetic acid caused little change in inherent viscosity. The inherent viscosity of the untreated sample was 0.887 and of the treated sample 0.835.

EXAMPLE III

Gray-colored molded discs of hydrogenated polybutadiene 0.075 inch in thickness were immersed for about 72 hours at room temperature in about 10 parts by weight of each of the following acids: acetic, propionic, butyric, valeric, caproic, heptanoic, and caprylic acids. At the end of this period of time, the discs had in each case become transparent, and had lost their gray color. The acids used were technical grade materials, substantially free of water.

EXAMPLE IV

A series of runs was made in which gray-colored solutions of hydrogenated polybutadiene in methylcyclohexane were treated with different acids. In each case a solution containing 5 percent by weight of the hydrogenated polybutadiene was heated to 180° F., 1 part by weight of acid per one part of polymer was added, and the container shaken. When diluted acid was used, the amount added was based on acid prior to dilution. The acids tested were concentrated hydrochloric acid, hydrochloric acid containing 33½ percent water, glacial acetic acid, and acetic acid containing 33⅓ percent water. The two acetic acid treated portions were colorless following treatment. The two hydrochloric acid treated portions were slightly yellow.

EXAMPLE V

Dark-colored methylcyclohexane solutions of hydrogenated polybutadiene were treated with acetic acid at different temperatures in order to determine the effect of temperature on the decolorization treatment. The tests were made at 180° F. and at room temperature.

In the first run, 426 grams of hydrogenated polybutadiene was added to sufficient methylcyclohexane to make 15 liters of solution. Ten liters of this solution were then heated to 180° F. and to it was added 12.1 ml. of glacial acetic acid and 57.5 ml. of water. The solution was stirred for 30 minutes. At the end of that time, the solution appeared colorless.

In the second run, a solution was similarly prepared. To 10 liters of this solution maintained at room temperature it was necessary to increase the amount of acetic acid added to 150 ml. in order to effect decolorization in one hour.

In an additional run, to ten liters of a solution prepared as before and heated to 180° F., was added 1 ml. of glacial acetic acid. The solution was stirred for 10 minutes. At the end of this time the solution appeared completely colorless.

EXAMPLE VI

A 41° F. polybutadiene rubber having a Mooney value of 20 (ML-4) was hydrogenated at 400° F. using a nickel-kieselguhr catalyst. The product had an unsaturation of 1.0 percent, a tensile strength of 1990 p.s.i.g. and an elongation of 725 percent. A portion of this material was molded into a ⅛ inch thick sheet. This sheet was then cut in two and one-half of it was immersed in glacial acetic acid for 72 hours at 78° F., washed with water, and dried under vacuum at 60° C.

A portion of this molded sheet, before and after treatment, was analyzed for nickel content and it was found that the nickel content was the same within the limit of experimental variation.

It will be evident to those skilled in the art that various modifications of this invention can be made, or followed, in the light of the foregoing disclosure without departing from the scope of my invention.

I claim:

1. A method of decolorizing a polymer prepared by emulsion polymerization selected from group consisting of homopolymers of butadiene and copolymers of butadiene and styrene, prepared from monomer mixtures containing not over thirty parts by weight of styrene per 100 parts by weight of monomers, said polymers having a gray color as a result of the reduction of the residual unsaturation by at least 50 percent by hydrogenating same in the presence of a nickel catalyst, said method comprising contacting the polymer with an acid selected from the group consisting of saturated unsubstituted carboxylic acids containing 2 to 8 carbon atoms.

2. The method of claim 1 wherein said polymer is a copolymer of butadiene and styrene prepared from a monomer mixture containing not over thirty parts by weight of styrene per one hundred parts by weight of monomers.

3. The method of decolorizing a homopolymer of butadiene prepared by emulsion polymerization, said polymer having a gray color as a result of the reduction of the residual unsaturation by at least 50 percent by hydrogenating same in the presence of a nickel catalyst, said method comprising contacting a polymer with an acid selected from the group consisting of saturated unsubstituted carboxylic acids containing 2 to 8 carbon atoms.

4. The process of claim 3 wherein said acid is acetic acid.

5. The process of claim 4 wherein an aqueous solution of said acetic acid is used.

6. The process of claim 3 wherein said acid is propionic acid.

7. The process of claim 3 wherein said acid is butyric acid.

8. The process of claim 3 wherein said acid is valeric acid.

9. The process of claim 3 wherein said acid is caproic acid.

10. The method of decolorizing a homopolymer of butadiene prepared by emulsion polymerization, said polymer having a gray color as a result of the reduction of the residual unsaturation by at least 50 percent by hydrogenating same in the presence of a nickel catalyst, said method comprising dissolving said polymer in a solvent and contacting the resulting solution with an acid selected from the group consisting of saturated unsubstituted carboxylic acids containing 2 to 8 carbon atoms, amount of said acid being 0.01 to 5 percent by weight based upon the weight of said polymer.

11. The method of decolorizing a homopolymer of butadiene prepared by emulsion polymerization, said polymer having a gray color as a result of the reduction of the residual unsaturation by at least 50 percent by hydrogenating same in the presence of a nickel catalyst, said method comprising contacting said polymer in solid form with an acid selected from the group consisting of saturated unsubstituted carboxylic acids containing 2 to 8 carbon atoms.

12. The process of claim 11 wherein said acid is acetic acid.

13. The process of claim 3 in which said acid is heptanoic acid.

14. The process of claim 3 in which said acid is caprylic acid.

References Cited in the file of this patent

UNITED STATES PATENTS

| | | |
|---|---|---|
| 2,115,564 | Thomas et al. | Apr. 26, 1938 |
| 2,160,931 | Wiley | June 6, 1939 |
| 2,693,461 | Jones | Nov. 2, 1954 |
| 2,751,277 | Coover et al. | June 19, 1956 |
| 2,813,809 | Jones et al. | Nov. 19, 1957 |